United States Patent
Gitlin et al.

(10) Patent No.: US 6,691,170 B1
(45) Date of Patent: Feb. 10, 2004

(54) METHOD AND APPARATUS FOR SIMPLIFYING ADDRESSING OF A NETWORKED DEVICE

(75) Inventors: Jonathan A. Gitlin, Hillsboro, OR (US); Sachin B. Godse, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/537,951

(22) Filed: Mar. 28, 2000

(51) Int. Cl.⁷ .............................................. G06F 15/16
(52) U.S. Cl. ........................ 709/245; 709/220; 709/222
(58) Field of Search .................................. 709/226, 245, 709/200, 238, 220–223

(56) References Cited

U.S. PATENT DOCUMENTS

| | | | | |
|---|---|---|---|---|
| 5,835,725 A | * | 11/1998 | Chiang et al. | 709/228 |
| 5,838,907 A | * | 11/1998 | Hansen | 709/220 |
| 5,918,016 A | * | 6/1999 | Brewer et al. | 709/220 |
| 5,974,453 A | * | 10/1999 | Andersen et al. | 709/220 |
| 6,101,499 A | * | 8/2000 | Ford et al. | 707/10 |
| 6,115,545 A | * | 9/2000 | Mellquist | 709/220 |
| 6,249,814 B1 | * | 6/2001 | Shaffer et al. | 709/223 |
| 6,292,838 B1 | * | 9/2001 | Nelson | 709/236 |
| 6,463,530 B1 | * | 10/2002 | Sposato | 713/2 |

* cited by examiner

Primary Examiner—Glenton B. Burgess
Assistant Examiner—Yasin Barqadle
(74) Attorney, Agent, or Firm—Blakely, Sokoloff, Taylor & Zafman LLP (57) ABSTRACT

A method for detecting a presence of a device on a network, and determining if an address exists for the device within the network. If it is determined that the address exists, recall the existing address of the device. Additionally, if it is determined an address does not exist for the device, generate and store an address for the device.

21 Claims, 5 Drawing Sheets

METHOD AND APPARATUS FOR SIMPLIFYING ADDRESSING OF A NETWORKED DEVICE

FIELD OF INVENTION

The present invention relates to the field of networked devices. More specifically, the present invention relates to configuring the internet protocol (IP) address of a networked device.

BACKGROUND OF THE INVENTION

As technology moves towards increased use of computers, an increasing number of computers are being networked together. Networks allow computers to share resources like memory space and access to various devices such as printers. No longer are networks only being used in large institutions, but instead, networks often consist of two or three computers networked to a single shared printer within a small business or a household.

As smaller network environments proliferate, such as in small businesses and households, efficiently managing network communications among the networked devices becomes more important. An important part of managing network communications is assigning addresses such as an internet protocol (IP) address to each device on the network. In order to facilitate efficient and reliable communications among the networked devices, the IP addresses have been managed by either an information technology (IT) administrator or a server that manages the IP addresses such as a dynamic host configuration protocol (DHCP) server.

A drawback to the method of employing an IT administrator or a DHCP server to manage IP addresses is that the operating budgets of small networks may not permit management of the IP addresses by an IT administrator or a DHCP server. That is, an IT administrator or a DHCP server may be prohibitively expensive for many small businesses and households. In order to address small networks without the cost of an IT administrator or a DHCP server, manufacturers are installing within their devices a limited operating system for randomly generating an IP address.

As smaller numbers of computers are networked (i.e., small businesses or home environments with a limited number of computers and small budgets), the demand for small networks is increased. In order to facilitate the networking (i.e., assigning and managing IP addresses) of devices, some devices generate their own random IP addresses without the need for an IT person or a DHCP server. Whenever devices are powered up on a network, it randomly generates a new IP address and other devices such as computers, configure themselves to communicate with the devices based on the newly generated IP addresses.

BRIEF DESCRIPTION OF THE DRAWINGS

The present invention is illustrated by way of example and not by way of limitation in the figures of the accompanying drawings, in which the like references indicate similar elements and in which.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Typically, in today's network environment, communications between devices on a network is achieved through a communications protocol, in particular, transmission control protocol/internet protocol (TCP/IP). In order for devices to communicate with one another through the network, the devices each have a unique internet protocol (IP) address. The IP addresses define the two ends of communications on the network, data sending devices and the data receiving devices.

All devices connected to a network are either assigned permanent IP addresses or assigned random IP addresses. One manual method for assigning IP addresses may involve an information technology (IT) administrator to manually assign and manage IP addresses on each device on the network. Another method for assigning IP addresses may involve the utilization of a server known as dynamic host configuration protocol (DHCP) that requires a DHCP server. A DHCP server will automatically assign unallocated IP addresses from the range of available IP addresses to devices using DHCP client protocols.

Figure 1:
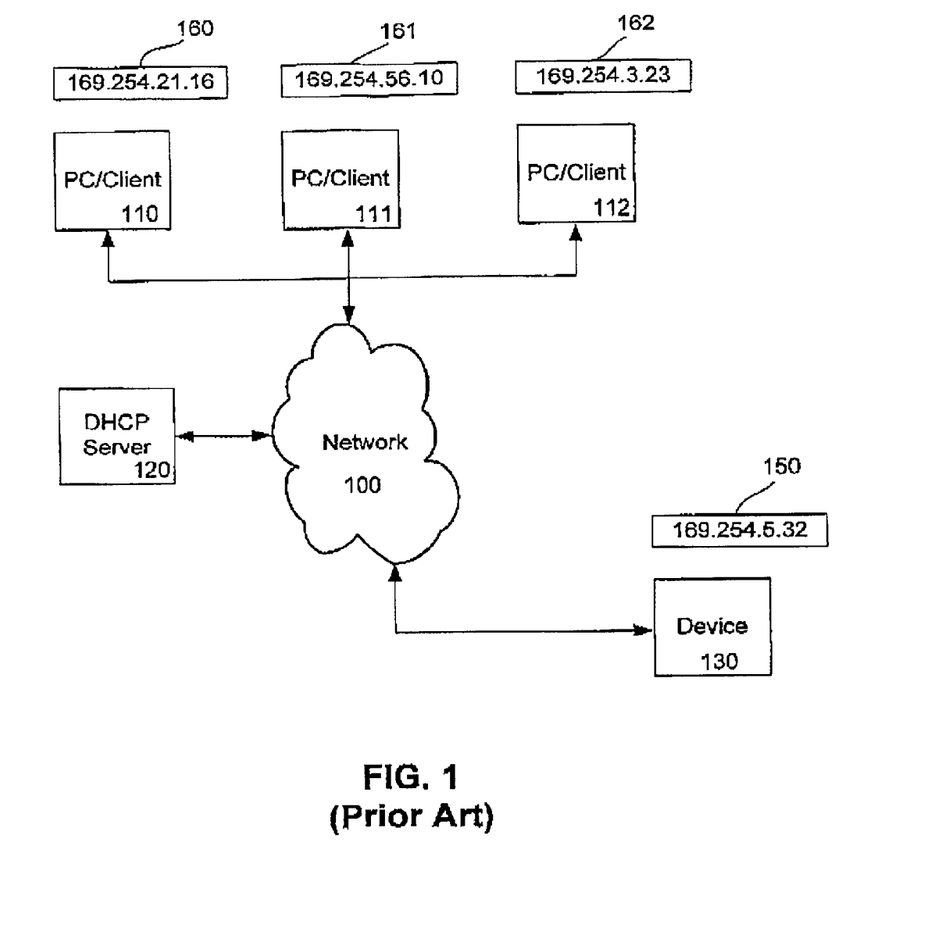
FIG. 1 illustrates an example prior art of assignment and management of IP addresses of devices by a DHCP server on a network, where the network may be, but not limited to, a TCP/IP network.
Figure 2:
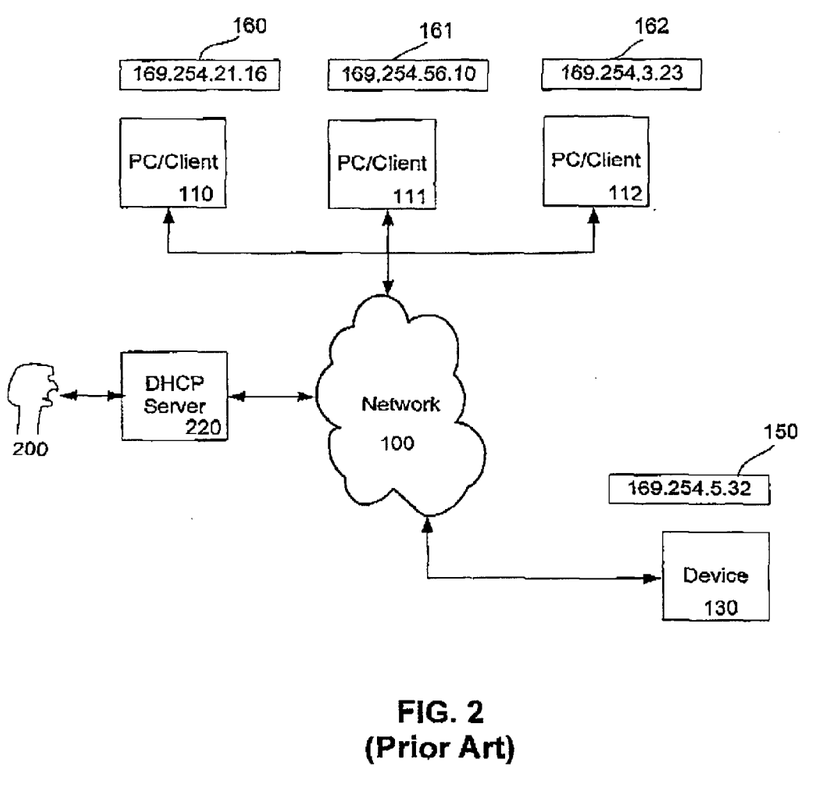
FIG. 2 illustrates an example of prior art of assignment and management of IP addresses by an IT administrator.

FIGS. 1 and 2 illustrate a prior art embodiment for IP address management by a DHCP server and a prior art embodiment for IP address management by an IT administrator.

FIG. 1 illustrates an example of assignment and management of IP addresses of devices by a DHCP server on a network, where the network may be, but is not limited to, a TCP/IP network. In FIG. 1, three devices such as personal computers (PC)/clients 110–112 are connected to a network 100. Also connected to the network 100 is a DHCP server 120 and a device such as a printer 130. It should be appreciated by those skilled in the art that the networked device 130 may be any type of device connected to a network such as, but not limited to, a printer device.

Illustrated in FIG. 1, as the device 130 is powered on and connected to the network, the DHCP server assigns unallocated IP address 150 to the device 130 and IP addresses 160–162 to the PC/clients 110–112 on the network 100. It should be appreciated by those skilled in the art that FIG. 1 shows IP addresses with first octets (169) and the second octets (254) denoting local link IP address (i.e., non-routable IP addresses), however, the IP addresses may be of any type known in the art. The numbers illustrating the IP addresses 150 and 160–162 are shown for illustrative purposes only because typically, the DHCP server does not assign IP addresses with the above discussed octets.

The DHCP server 120 manages the IP address 150 of the device 130 and the IP addresses 160–162 of the PC/clients 110–112 on the network 100 by ensuring that if another device (not shown) is connected to the network 100, there are no two identical IP addresses on the network 100. If the DHCP server 120 detects two or more identical IP addresses on the network 100, the DHCP server 120 will randomly generate an alternate IP address and assign the new randomly generated IP address to one of the devices. If the device 130 or the PC/clients 110–112 are power down, when the device 130 or the PC/clients 110–112 are powered back up, the DHCP server 120 will negotiate new IP addresses for the device and the PC/clients connecting onto the network 100. It should be appreciated by those skilled in the art that assigning and managing IP addresses by a DHCP server is well known in the art and need not be discussed further.

FIG. 2 illustrates an example of assignment and management of IP addresses by an IT administrator. In FIG. 2, similar to FIG. 1, three devices PC/clients 110–112 are connected to a network 100. Additionally, similar to FIG. 1, a device 130 is connected to the network 100. However, in FIG. 2, a terminal 220 is also connected to the network 100. The terminal 220 is operated by an IT administrator 200, and through the terminal 220, the IT administrator 200 assigns IP addresses 150 and 160–162 manually. Issues that arise such as, but not limited to identical IP addresses would not arise because the IT administrator 200 manually manages the IP addresses to resolve the issues. In the network environment of FIG. 2, an IT administrator is required to initially set up and manage the IP addresses of devices and PC/clients on a network. As discussed above, it should be appreciated by those skilled in the art that FIG. 2 shows IP addresses with first octets (169) and the second octets (254) denoting local link IP address (i.e., non-routable IP addresses), however, the IP addresses may be of any type known in the art. Additionally, the assigning and managing of IP addresses manually by an IT administrator is well known in the art and need not be discussed further.

Figure 3:
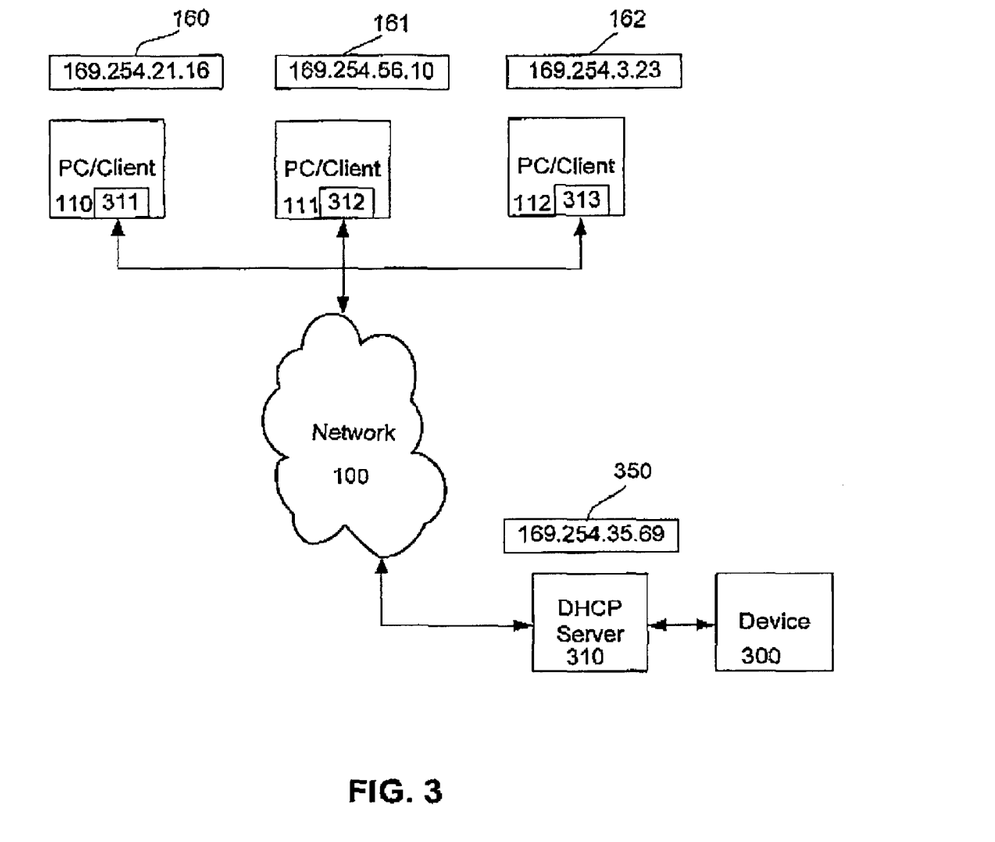
FIG. 3 illustrates one embodiment of the present invention for assigning and managing IP addresses of devices on a network without requiring an IT administrator or a DHCP server.

FIG. 3 illustrates one embodiment of the present invention for assigning and managing IP addresses of devices on a network without requiring an IT administrator or a DHCP server. In FIG. 3, similar to FIGS. 1 and 2, three PC/clients 110–112 are connected on the network 100. However, in FIG. 3, connected to the network 100 are device servers 310–313 in accordance with the present invention. Additionally, shown in FIG. 3, is a device 300 connected to the device server 310 and PC/clients 110–112 incorporating device servers 311–313.

Illustrated in FIG. 3, the device server 310 has an IP address 350 which may correspond to a hardware address of the device server 310, and PC/clients 110–112 has IP addresses 160–162 which may correspond to hardware addresses of the device servers 311–313 incorporated in the PC/clients 110–112. Again, in FIG. 3 the IP addresses 350 and 160–162 of the device server 310 and the PC/clients 110–112 shows an IP address 350 with the first octets (169) and the second octets (254) denoting a local link IP address, however, the IP addresses may be of any type known in the art.

Shown in FIG. 3, because the hardware addresses of the device servers 310–313 are used as the IP addresses of the device 300 and the PC/clients 110–113, a DHCP server 120 (shown in FIG. 1) or an IT administrator 200 (shown in FIG. 2) is not required. It should be appreciated by those skilled in the art that hardware addresses are well known in the art.

Figure 4:
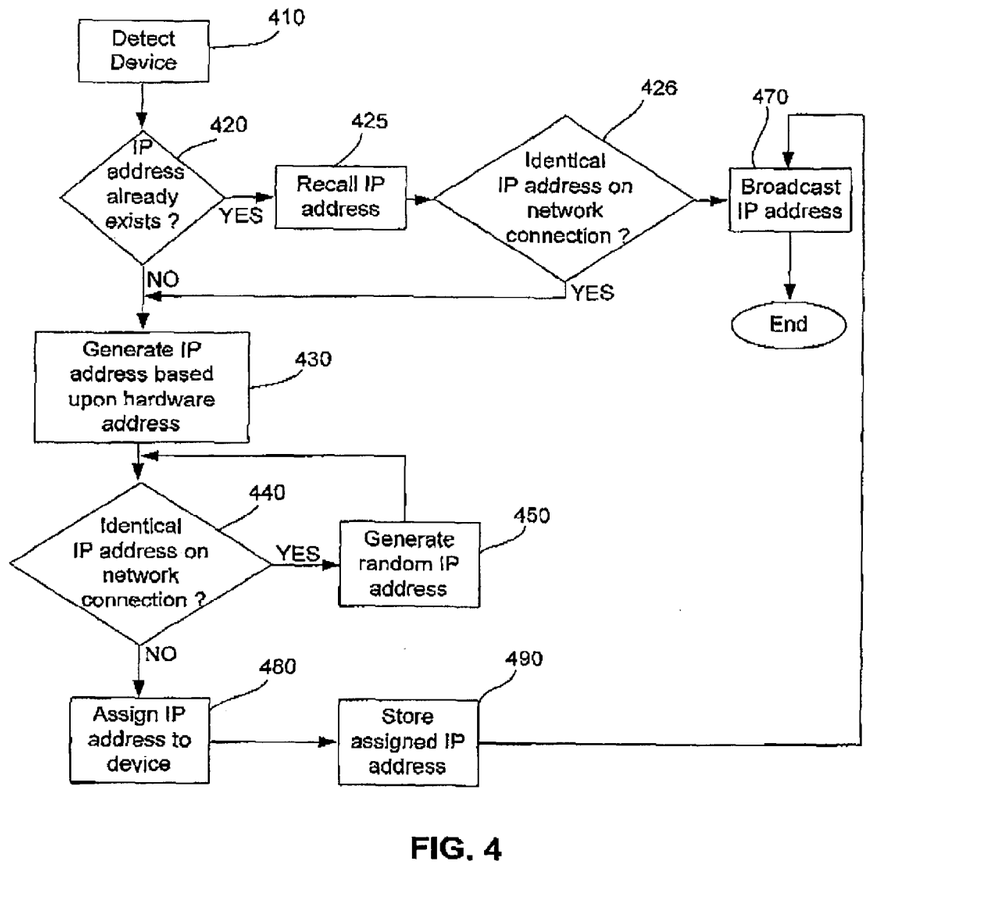
FIG. 4 illustrates the operational flow for assigning and managing an IP address without a DHCP server or an IT administrator according to an embodiment of the present invention.

FIG. 4 illustrates the operational flow for assigning and managing an IP address without a DHCP server or an IT administrator according to an embodiment of the present invention.

As shown in FIG. 4, a device is detected powering up 410 and connecting onto the network 100. The device that is detected powering up and connecting onto the network 100 may be the device servers 310–313, the device 300 connected to the device servers 310–313 (shown in FIG. 3), or any other device known in the art to connect to a network. Once the device powering up and connecting onto the network 100 is detected 410, the device servers 310–313 determine if an IP address already exists 420 for the device powering up and connecting onto the network 100 in accordance with an embodiment of the present invention.

If the device servers 310–313 determine that the device that is powering up and connecting onto the network 100 does not already have an IP address, the device servers 310–313 generate an IP address based upon a hardware address of the device servers 430.

If the device servers 310–313 that generated the IP address based upon the hardware address of the device server, determine that there is another device on the network 100 having an IP address that is identical to the generated IP address based upon the hardware address of the device servers 310–313, the device servers 310 randomly generate another IP address 450. Again, the device servers 310–313 determine if there is an identical IP address to the randomly generated IP address, and the device servers 310–313 will randomly generate an IP address until no identical IP address is detected on the network 100.

Once the device servers 310–313 determine that there is no identical IP address on the network 100, the device servers 310–313 assign the generated (i.e., generated upon hardware address or randomly generated) IP address 480 to the device that is powering up and connecting onto the network 100. Additionally, the generated and assigned random IP address is stored in memory 490 as an IP address that will already exist for the device if the device is power down, and then, subsequently, powering up 410 and connected onto the network 100. Furthermore, the generated IP address is broadcast onto the network 470.

If the device servers 310–313 determine that the device that is powering up and connecting onto the network 100 does already have an IP address stored in memory 420, the device servers 310–313 recall the stored IP address 425, and when determine if there is an identical IP address to the already existing IP address 426. If the device servers 310–313 determine that the there is no IP address that is identical to the already existing IP address of the device that is powering up and connecting onto the network 100, the device servers 310–313 broadcast the recalled and assigned IP address 470 onto the network 100.

Figure 5:
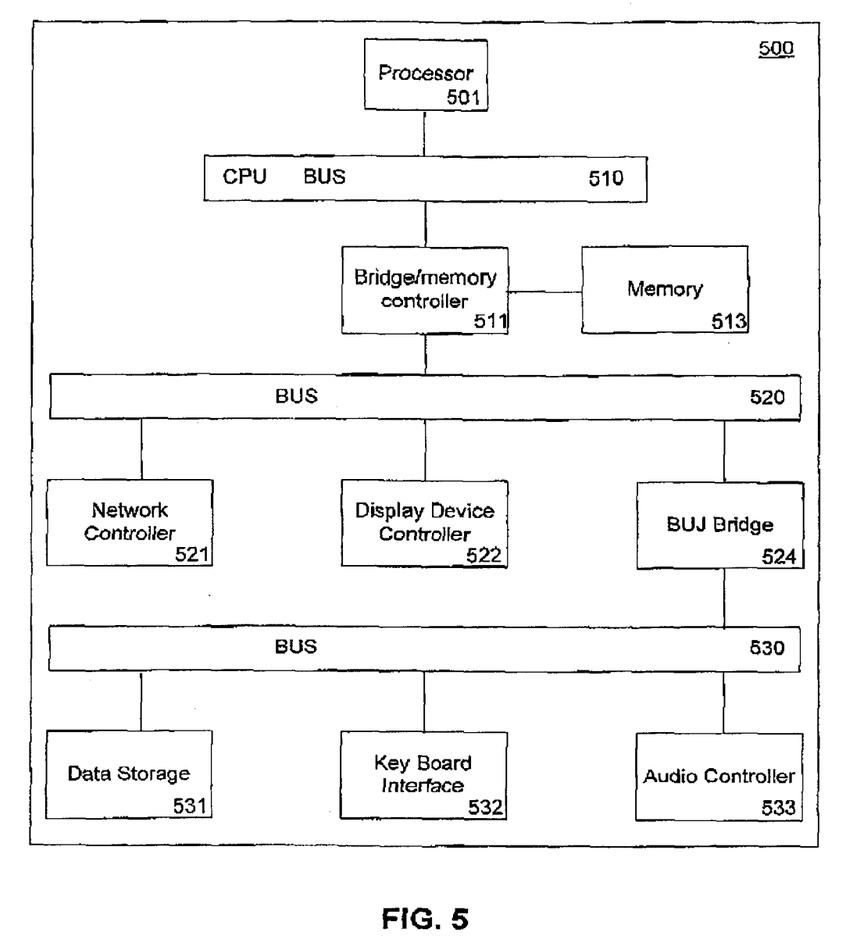
FIG. 5 illustrates a computer system upon which an embodiment of the present invention can be implemented.

FIG. 5 illustrates a computer system 500 upon which an embodiment of the present invention can be implemented. The computer system 500 includes a processor 501 that processes data signals. The processor 501 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 5 shows an example of the present invention implemented on a single processor computer system 500. However, it is understood that the present invention may be implemented in a computer system having multiple processors. The processor 501 is coupled to a CPU bus 510 that transmits data signals between processor 501 and other components in the computer system 500.

The computer system 500 includes a memory 513. The memory 513 may be a dynamic random access memory (DRAM) device, a synchronous direct random access memory (SDRAM) device, or other memory device. The memory 513 may store instructions and code represented by data signals that may be executed by the processor 501.

A bridge/memory controller 511 is coupled to the CPU bus 510 and the memory 513. The bridge/memory controller 511 directs data signals between the processor 501, the memory 513, and other components in the computer system 500 and bridges the data signals between the CPU bus 510, the memory 513, and a first I/O bus 520.

The first I/O bus 520 may be a single bus or a combination of multiple buses. As an example, the first I/O bus 520 may comprise a Peripheral Component Interconnect (PCI) bus, a Personal Computer Memory Card International Association (PCMCIA) bus, a NuBus, or other buses. The first I/O bus 520 provides communication links between components in the computer system 500. A network controller 521 is coupled to the first I/O bus 520. The network controller 521 links the computer system 500 to a network of computers (not shown in FIG. 5) and supports communication among the machines. A display device controller 522 is coupled to the first I/O bus 520. The display device controller 522 allows coupling of a display device (not shown) to the computer system 500 and acts as an interface between the display device and the computer system 500. The display device controller 522 may be a monochrome display adapter (MDA) card, a color graphics adapter (CGA) card, an enhanced graphics adapter (EGA) card, an extended graphics array (XGA) card or other display device controller. The display device (not shown) may be a television set, a computer monitor, a flat panel display or other display device. The display device receives data signals from the processor 501 through the display device controller 522 and displays the information and data signals to the user of the computer system 500.

A second I/O bus 530 may be a single bus or a combination of multiple buses. As an example, the second I/O bus 530 may comprise a PCI bus, a PCMCIA bus, a NuBus, an Industry Standard Architecture (ISA) bus, or other buses. The second I/O bus 530 provides communication links between components in the computer system 500. A data storage device 531 is coupled to the second I/O bus 530. The data storage device 531 may be a hard disk drive, a floppy disk drive, a CD-ROM device, a flash memory device or other mass storage device. A keyboard interface 532 is coupled to the second I/O bus 530. The keyboard interface 532 may be a keyboard controller or other keyboard interface. The keyboard interface 532 may be a dedicated device or can reside in another device such as a bus controller or other controller. The keyboard interface 532 allows coupling of a keyboard (not shown) to the computer system 500 and transmits data signals from a keyboard to the computer system 500. An audio controller 533 is coupled to the second I/O bus 530. The audio controller 533 operates to coordinate the recording and playing of sounds.

A bus bridge 524 couples the first I/O bus 520 to the second I/O bus 530. The bus bridge 524 operates to buffer and bridge data signals between the first I/O bus 520 and the second I/O bus 530.

Certain embodiments may include additional components, may not require all of the above components, or may combine one or more components. Those skilled in the art will be familiar with a variety of alternative networks.

In one embodiment, the device server, as described above, is implemented using one or more computers such as the computer system of FIG. 5. In one embodiment, the present invention is implemented as software routines executed by one or more execution units within the computer(s). For a given computer system, the software routines can be stored on a storage device, such as memory 513.

In one embodiment, the software routines are written in the C programming language. It should be appreciated that the software routine may be implemented in any of a wide variety of programming languages. In alternate embodiments, the present invention is implemented in discrete hardware or firmware. For example, one or more application specific integrated circuit (ASICs) could be programmed with one or more or the above described functions of the device server. In another example, one or more functions of the device server could be implemented in one or more ASICs on additional circuit boards, and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a method and apparatus for assigning and managing IP addresses of devices on a network without requiring an IT administrator or a DHCP servers is described.

In the forgoing description, the invention is described with reference to specific exemplary embodiments thereof. It will, however, be evident that various modifications and changes may be make thereto without departing from the broader spirit and scope of the present invention as set forth in the appended claims. The specifications and drawings are accordingly to be regarded in an illustrative rather than in a restrictive sense.

What is claimed is:

1. A method comprising:
   detecting, by a first device, a presence of a second device on a network;
   determining, by said first device, if an address exists for said second device;
   recalling, by said first device, an existing address if said address exists; and
   generating and storing, by said first device, for said second device, an address based upon a hardware address of said first device, if said address does not exist.

2. The method of claim 1, wherein said device comprises at least one of a computer, a printer, a fax machine, a multifunctional device, and a device server.

3. The method of claim 1, wherein said determining comprises determining if said address exists for said device within one of a local area network (LAN) or a wide area network (WAN).

4. The method of claim 1, wherein said determining comprises determining if an internet protocol (P) address exists.

5. The method of claim 1, wherein said generating and storing comprises storing in a non-volatile memory.

6. The method of claim 1, wherein said detecting comprises detecting a power up signal of said device.

7. The method of claim 1, wherein said detecting comprises detecting a device connection onto said network.

8. A storage medium having stored therein a plurality of instructions that are machine executable, wherein when executed, said executing instructions operate to:
- detect, by a first device, a presence of a second device on a network;
- determine, by said first device, if an address exists for said second device;
- recall, by said first device, an existing address if said address exists; and
- generate and store, by said first device, for said second device, an address based upon a hardware address of said first device, if said address does not exist.

9. The storage medium of claim 8, wherein said executing instructions operate to detect at least one of a computer, a printer, a fax machine, a multifunctional device, and a device server.

10. The storage medium of claim 8, wherein said executing instructions operate to determine if said address exists for said device within one of a local area network (AN) or a wide area network (WAN).

11. The storage medium of claim 8, wherein said executing instructions operate to determine if an internet protocol (IF) address exists.

12. The storage medium of claim 8, wherein said executing instructions operate to store in a non-volatile memory.

13. The storage medium of claim 8, wherein said executing instructions operate to detect a power up signal of said device.

14. The storage medium of claim 8, wherein said executing instructions operate to detect a device connection onto said network.

15. An apparatus comprising:
- a storage medium having stored therein a plurality of instructions that are machine executable, wherein when executed, said executing instructions operate to detect, by a first device, a presence of a second device on a network; determine, by said first device, if an address exists for said second device; recall, by said first device, an existing address if said address exists; and generate and store, by said first device, for said second device, an address based upon a hardware address of said first device, if said address does not exist; and
- a processor coupled to said storage medium to execute said instructions.

16. The apparatus of claim 15, wherein said executing instructions operate to detest at least one of a computer, a printer, a fax machine, a multifunctional device, and a device server.

17. The apparatus of claim 15, wherein said executing instructions operate to determine if said address exists for said device within one of a local area network (LAN) or a wide area network (WAN).

18. The apparatus of claim 15, wherein said executing instructions operate to determine if an internet protocol (IP) address exists.

19. The apparatus of claim 15, wherein said executing instructions operate to store in a nonvolatile memory.

20. The apparatus of claim 15, wherein said executing instructions operate to detect a power up signal of said device.

21. The apparatus of claim 15, wherein said executing instructions operate to detect a device connection onto said network.

* * * * *

UNITED STATES PATENT AND TRADEMARK OFFICE
CERTIFICATE OF CORRECTION

PATENT NO. : 6,691,170 B1
DATED : February 10, 2004
INVENTOR(S) : Gitlin et al.

It is certified that error appears in the above-identified patent and that said Letters Patent is hereby corrected as shown below:

Column 4,
Line 54, delete "when" and insert -- then --.
Line 54, delete "(IF)" and insert -- (IP) --.

Column 6,
Line 64, delete "(P)" and insert -- (IP) --.

Column 7,
Line 24, delete "(AND)" and insert -- (LAN) --.

Signed and Sealed this

Fifteenth Day of June, 2004

JON W. DUDAS
*Acting Director of the United States Patent and Trademark Office*